(12) United States Patent
Haldorsen et al.

(10) Patent No.: US 8,547,795 B2
(45) Date of Patent: Oct. 1, 2013

(54) VSP IMAGING OF ACOUSTIC INTERFACES

(75) Inventors: Jakob Brandt Utne Haldorsen, Somerville, MA (US); Richard T. Coates, Middlebury, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 727 days.

(21) Appl. No.: 12/580,434

(22) Filed: Oct. 16, 2009

(65) Prior Publication Data

US 2010/0103774 A1 Apr. 29, 2010

Related U.S. Application Data

(60) Provisional application No. 61/106,003, filed on Oct. 16, 2008.

(51) Int. Cl.
*G01V 1/00* (2006.01)
(52) U.S. Cl.
USPC .......................................................... 367/75
(58) Field of Classification Search
USPC ............................ 367/36–38, 75; 702/14, 16
See application file for complete search history.

(56) References Cited

U.S. PATENT DOCUMENTS

| | | | |
|---|---|---|---|
| 4,635,238 A | | 1/1987 | Gallagher et al. |
| 4,648,039 A | * | 3/1987 | Devaney et al. ................ 702/17 |
| 4,706,224 A | | 11/1987 | Alford |
| 4,905,204 A | * | 2/1990 | Hughes ............................ 367/62 |
| 5,200,928 A | * | 4/1993 | MacLeod ......................... 367/27 |
| 7,164,619 B2 | * | 1/2007 | Robertsson et al. ............. 367/21 |
| 7,508,733 B2 | * | 3/2009 | Haldorsen ........................ 367/41 |
| 2010/0139927 A1 | * | 6/2010 | Bakulin et al. ................. 166/369 |

OTHER PUBLICATIONS

Arroyo et al, "Superior Seismic Data from the Borehole", Oilfield Review, Jan. 2003, vol. 15, issue 1, pp. 2-23.
Bostock et al, "Multiparameter two-dimensional inversion of scattered teleseismic body waves, 1. Theory for oblique incidence", Journal of Geophysical Research, vol. 106, No. 12, pp. 30771-30782, Dec. 2001.
Haldorsen, Jakob, "Converted-shear and compressional images using projection imaging", EAGE 64th Conference & Exhibition—Florence Italy, May 27-30, 2002, Schlumberger Doll Research, 4 pages.
Haldorsen et al, "Multichannel wiener deconvolution of vertical seismic profiles", Geophysics, vol. 59, No. 10, Oct. 1994, pp. 1500-1511.
Leaney, et al, "Parametric decomposition of offset VSP wave fields", 59th Annual International Meeting, SEG, Expanded Abstracts, 1989, pp. 26-29.
Michaud et al, "Microseismic event localization and characterization in a limited aperture HFM experiment", SEG Int'l Exposition and 74th Annual Meeting, Denver, Colorado, Oct. 10-15, 2004, pp. 552-555.
Miller et al, "A new slant on seismic imaging: migration and integral geometry", Geophysics, vol. 52, No. 7, Jul. 1987, pp. 943-964.

(Continued)

*Primary Examiner* — Krystine Breier
(74) *Attorney, Agent, or Firm* — Rachel E. Greene; Jakub Michna; Bridget Laffey

(57) ABSTRACT

A method to generate images of acoustic contrasts for structures located between at least one acoustic source and at least one receiver, said structures converting a part of the compressional energy to shear.

16 Claims, 19 Drawing Sheets

(56) References Cited

OTHER PUBLICATIONS

Rondenay, et al, "Multiparameter two-dimensional inversion of scattered teleseismic body waves 3. Application to the cascadia 1993 data set", Journal of Geophysical Research, vol. 106, No. 12, pp. 30795-30807, Dec. 10, 2001.

Shragge et al, "Multiparameter two-dimensional inversion of scattered teleseismic body waves 2. Numerical examples", Journal of Geophysical Research, vol. 106, No. 12, pp. 30783-30793, Dec. 10, 2001.

* cited by examiner

VSP IMAGING OF ACOUSTIC INTERFACES

FIELD OF THE INVENTION

This invention relates broadly to Vertical Seismic Profile (VSP) imaging of acoustic interfaces. More particularly, this invention relates to a method to image acoustic interfaces between an offset seismic source and an array of 3-component receivers deployed in a well bore.

BACKGROUND OF THE INVENTION

Surface-seismic waveform data are used to generate images of the sub-surface geological structures. In principle, the acoustic impedance at a specific location is calculated as the ratio between the in-coming and the reflected energy. Vertical Seismic Profiling is a technique whereby reflection from the subsurface is recorded on down-hole geophones or receivers from wave fields generated by a surface seismic source.

Some processing methods use a parametric least-square method to decompose the wavefield incident on the receiver array locally into four plane waves: up- and down-going compressional, and up- and down-going shear polarized in the vertically plane (see Leaney, W. S. and C. Esmersoy, 1989, *Parametric Inversion of offset VSP wavefields: 59$^{th}$ Annual International Meeting, SEG, Expanded Abstracts*, 26-29). In more simplistic processing of VSP data, the incident wavefield is separated into down-going and up-going wavefield components. The up-going components of the wavefield are next deconvolved with the down-going components (see, e.g., Haldorsen, J. B. U., Miller, D. E., and Walsh, J., 1994, *Multichannel Wiener deconvolution of vertical seismic profiles, Geophysics*, 59, 1500-1511).

The deconvolved compressional or shear waves can be used to create images of the formation below the well using migration algorithms designed for this purpose (e.g., Miller, D., Oristaglio, M., and Beylkin, G., 1987, *A new slant on seismic imaging: Migration and integral geometry: Geophysics*, 52, 943-964, as applied by Haldorsen, J. B. U., 2002, *Converted-shear and compressional images using Projection Imaging*, paper F031, 64$^{th}$ Annual Meeting and Exhibition, European Association of Geoscientist and Engineers).

Bostock, et al., (see Bostock, M. G., S. Rondenay, and J. Shragge, *Multiparameter two-dimensional inversion of scattered teleseismic body waves*, 1, *Theory for oblique incidence, J. Geophys. Res.*, 106, 30,771-30,782, 2001) and Shragge et al. (see Shragge, J., M. G. Bostock, and S. Rondenay, *Multiparameter two-dimensional inversion of scattered teleseismic body waves*, 2, *Numerical examples, J. Geophys. Res.*, 106, 30,783-30,794, 2001), have developed a method whereby they decompose the p-wave coda from teleseismic events (seismic signals generated by distant earthquakes) into compressional and shear waves components, incident on a surface array of receivers. Rondenay et al., (see Rondenay, S., M. G. Bostock, and J. Shragge, *Multiparameter two-dimensional inversion of scattered teleseismic body waves*, 3, *Application to the Cascadia* 1993 *data set, J. Geophys. Res.*, 106, 30,795-30,808, 2001) have applied this to generate an image of the moho—the boundary between the earth crust and mantle—located about 40 km below a surface array of receivers. Essentially the method applied by Rondenay, et al., is similar to the method that is used for finding the locations of epicenters in earthquake and in passive seismic monitoring (e.g. Michaud, G., Leslie, D., Drew, J., Endo, T., and Tezuka, K., 2004, *"Microseismic event localization and characterization in a limited aperture HFM experiment", 74$^{th}$ Annual International Meeting, SEG, Expanded Abstracts*, pp. 552-555).

SUMMARY OF THE INVENTION

An embodiment of the method of the invention comprises processing seismic data to produce an image of acoustic contrasts within a geological formation, comprising recording seismic data received by at least one receiver at a first receiver location from signals emitted by at least one source at a first acoustic source location; determining the components of particle motion of the geological formation at the first receiver location from the recorded seismic data; estimating the direct compressional signal at the first receiver location from the components of particle motion of the geological formation at the first receiver location; deconvolving all the components of particle motion at the first receiver location using the estimated direct compressional signal; estimating, from a model of the geological formation, the difference between the shear and the compressional travel times from a first location in the geological formation to the first receiver location; estimating the shear-wave contribution at the first location in the geological formation using the deconvolved components of particle motion at the first receiver location and the estimated difference between the shear and the compressional travel times between the first receiver location and the first location in the geological formation; and repeating previous steps for a plurality of locations in the geological formation, wherein each location in the geological formation is located between the at least one acoustic source and the at least one receiver and wherein each location in the geological formation is linked to a pixel of the image of acoustic contrasts within the geological formation.

An embodiment of the method of the invention comprises VSP data recorded by a downhole array using a source that is laterally offset from the receivers. The method generates images of structures located between the source and the receivers, said structures converting a part of the compressional energy to shear. The disclosed method generates an image of the interface along which the conversion took place. For extended-reach, horizontal wells, this offers a unique possibility for locating the well relative to a shallower interface of acoustic impedance contrast.

BRIEF DESCRIPTION OF THE FIGURES

It will be recognized by the person of ordinary skill in the art, given the benefit of this disclosure, that certain dimensions, features, components, and the like in the figures may have been enlarged, distorted or otherwise shown in a non-proportional or non-conventional manner to facilitate a better understanding of the technology disclosed herein.

DETAILED DESCRIPTION OF THE INVENTION

Figure 1:
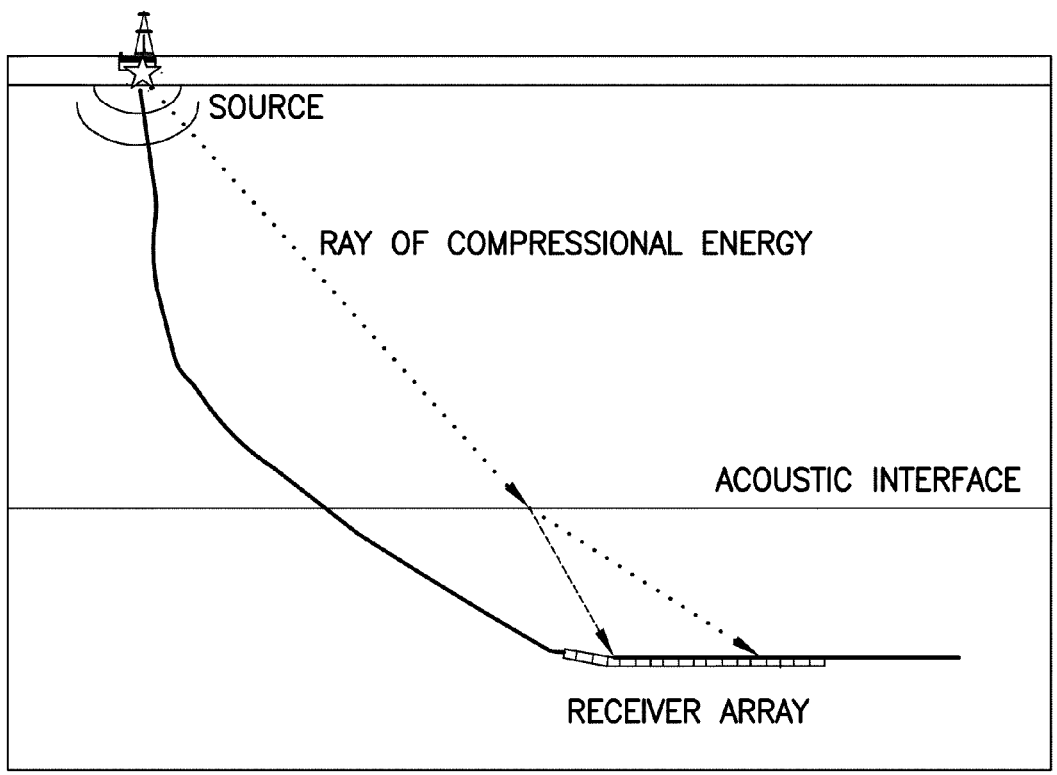
FIG. 1 represents an extended reach well with a rig source and a down-hole receiver array.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Converted-Wave Imaging

In one embodiment of the invention VSP data recorded with an offset compressional source are used in order to find the locations where the incident compressional wave is partially converted to shear.

In the embodiment, it will be assumed that the source primarily generates a compressional signal. Along the travel path from the source to the receivers, the down-going compressional wave will encounter a plurality of acoustic impedance contrasts that will reflect, deflect and distort it. Additionally, some of the compressional wavefield will be converted to shear wavefield. The converted shear wave will travel mostly alongside the compressional wave and arrive at the receiver with a delay determined by the difference in propagation velocities for these two types of waves. Having detected such a converted wave, denoting the compressional propagation velocity by $v_p$, the shear velocity by $v_s$, the distance back to the conversion interface $$d = \frac{\Delta t_{Sp}}{\frac{1}{v_s} - \frac{1}{v_p}}$$

is give by:

FIG. 1 illustrates the principal ideas involved. The figure shows an extended reach well with a rig source and a downhole receiver array. The horizontal interface between the two shades of gray illustrates an acoustic contrast. In the figure, the incident down-going compressional wave (the propagation direction indicated by the red dotted arrow) is split at this contrast into a refracted down-going compressional ray (blue dotted arrow) and a down-going, shear wave polarized in the vertical plane (yellow dotted arrow). For homogeneous isotropic formation close to the well bore and the conversion interface, the propagation direction of the converted shear relative to the direct compressional will be determined by their relative propagation velocities and the orientation of the interface. For the simple example illustrated in FIG. 1, with a planar interface, the relationship between the propagation directions of the refracted compressional and converted shear is described by Snell's law from elementary ray theory.

The polarization of the converted shear data will be known either from a prior wavefield separation (according to Leaney and Esmersoy, 1989), or from purely geometric considerations (like in Haldorsen, 2002)—and the location of the conversion point will be along the shear ray path perpendicular to the shear polarization.

For a horizontal interface, the converted shear will be polarized in the vertical plane. If the interface is perpendicular to the ray, no shear energy will be converted. The rate of conversion will be particularly high for an incident compressional wave grazing the interface, i.e., the preferred geometry for this technique will have a source that is displaced horizontally from the receiver array.

The converted shear event will be coherent with the primary compressional event; meaning that the deconvolution of the total wavefield recorded by the VSP receivers with an estimate of the incoming compressional wave (like in standard VSP processing), will also compress the converted shear signal and make it suitable for imaging.

The Process

The method presented limits demonstration to 2-D, however, same method is applicable to 3-D imaging.

For the final imaging step using a migration method, a velocity model as ones known in the art will be applied to the method. The method according to the invention proposes two embodiments for the imaging step, using a migration method. Each of these embodiment can be characterized by:

1—The total un-separated, deconvolved wavefield is submitted to the migration and the separation is done entirely within the migration operation (according to Haldorsen, 2002).

2—The wavefield is decomposed into separate components, and the explicit shear component polarized in the vertical plane is migrated using a scalar migration (according to Miller, et al., 1987)

Embodiment A, Flow Process:
a. Edit and stack data traces recorded at coincident source and receiver locations.
b. Orient the 3-component data traces into a polarization of particle movement along a vertical axis, and two horizontal axes, one in the plane of the well and one in a direction perpendicular to the well.
c. Pick travel times for the wave travelling directly from the source to the receivers (find the "break times" $t_n$).
d. Estimate the direct compressional signal (find "down-going" compressional field).
e. Deconvolve all x, y and z components of the wavefield with the estimated "down-going" compressional field.
f. Using a given velocity model, calculate the travel times for a compressional ($t_n^P$) and vertical shear ($t_n^s$) from each (x,y)-point in the image space to all receivers.
g. Find the difference $\Delta t_n^{ps} = t_n^s - t_n^P$ between the compressional and shear travel times.
h. Using the deconvolved total wavefield, find the vector of particle motion at the receivers at times $t_n + \Delta t_n^{ps}$
i. For each receiver, find the component of the vector of particle motion perpendicular to the ray connecting the receiver and the image point ("projection" step).
j. For each point in image space, sum the projected contributions for all receivers using appropriate weights standard migration theory (in our case, we have used the weights described by Miller, et al., 1987).

Embodiment B, Flow Process:
a. Edit and stack data traces recorded at coincident source and receiver locations.
b. Orient the 3-component data traces into a polarization of particle movement along a vertical axis, and two horizontal axes, one in the plane of the well and one in a direction perpendicular to the well.
c. Pick travel times for the wave travelling directly from the source to the receivers (find the "break times" $t_n$).
d. Use a parametric wavefield separation technique to estimate the direct compressional signal (find the "down-going" compressional field) and the down-going vertical shear (in our case, we can use the method described by Leaney and Esmersoy (1989).
e. Deconvolve the estimated down-going vertical shear wavefield with the estimated "down-going" compressional field.
f. Using a given velocity model, calculate the travel times for a compressional ($t_n^P$) and vertical shear ($t_n^s$) from each (x,y)-point in the image space to all receivers.
g. Find the difference $\Delta t_n^{ps} = t_n^s - t_n^P$ between the compressional and shear travel times.
h. For each receiver, find the amplitude of the deconvolved down-going vertical shear at times $t_n + \Delta t_n^{ps}$
i. For each point in image space, sum the contributions for all receivers, using appropriate weights standard migration theory (in our case, we have used the weights described by Miller, et al., 1987).

Application (Embodiment A)

Figure 2:
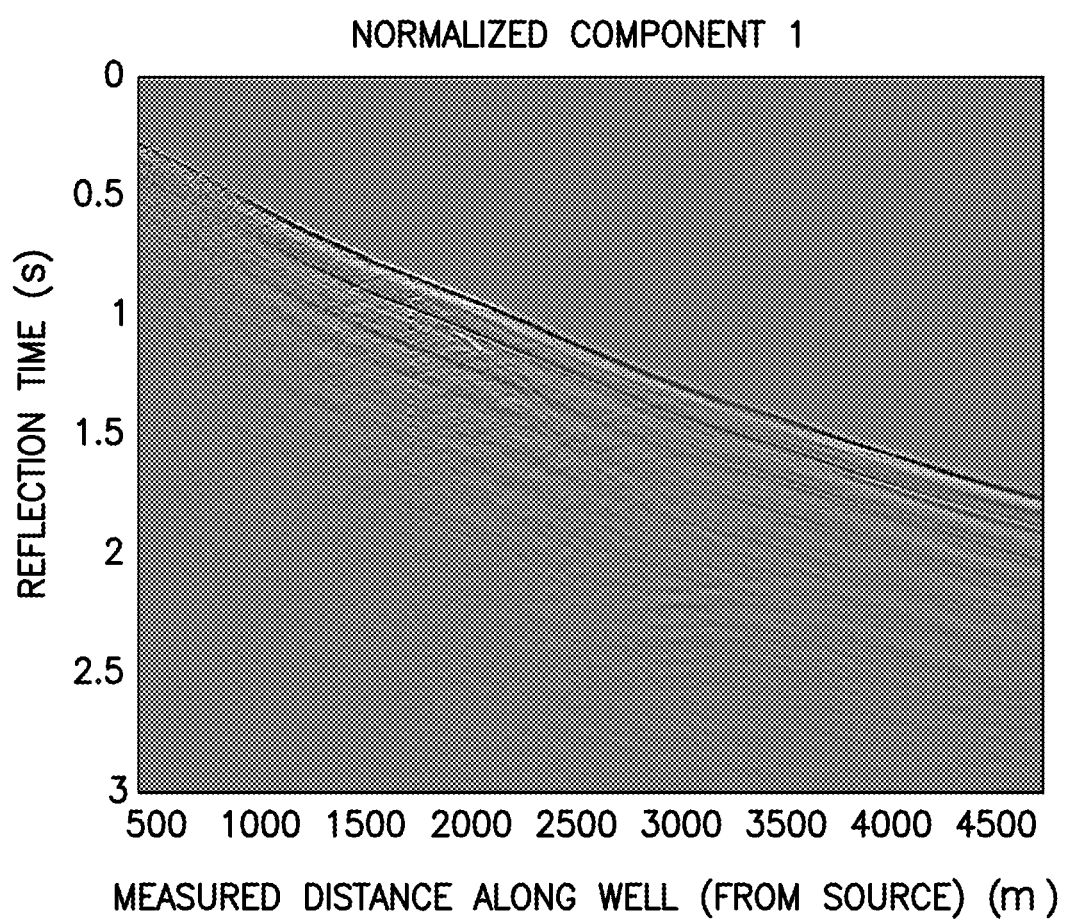
FIG. 2 represents components of data, in-line and transverse to a horizontal well.
Figure 3:
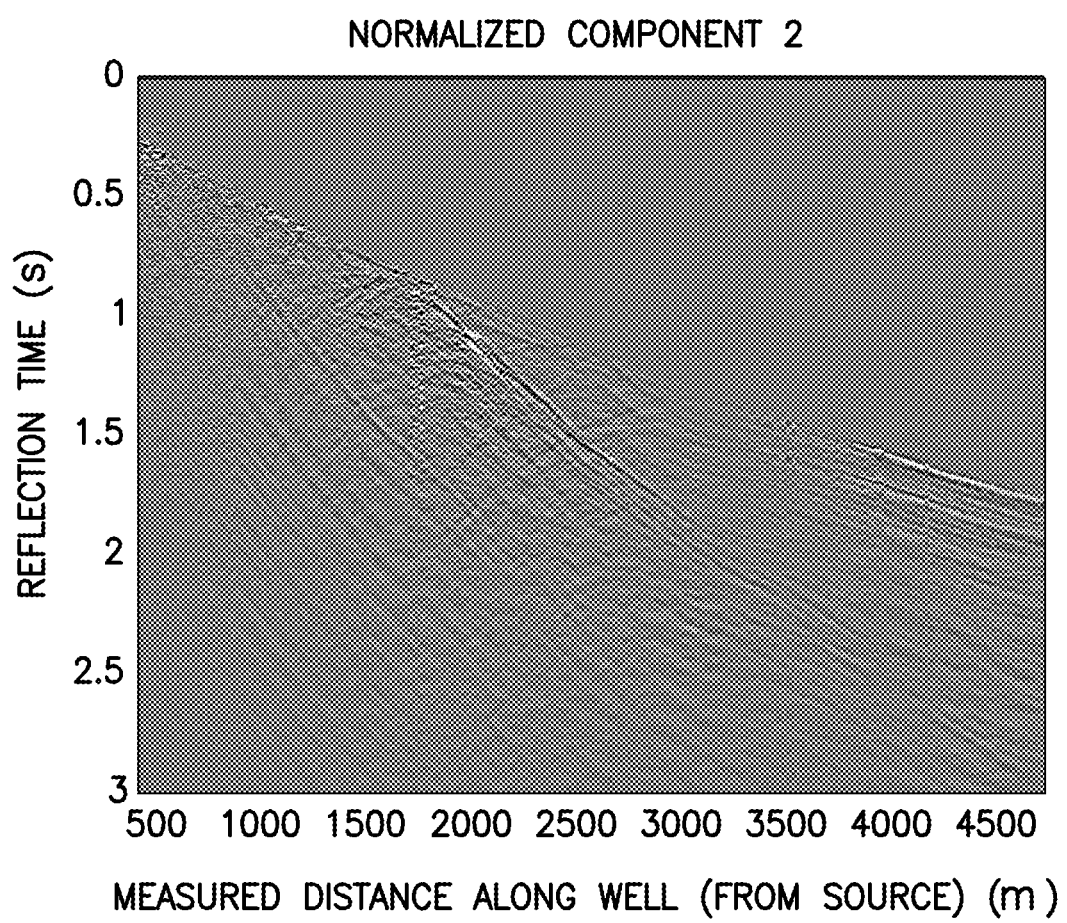
FIG. 3 represents components of data, cross-line and transverse to a horizontal well.
Figure 4:
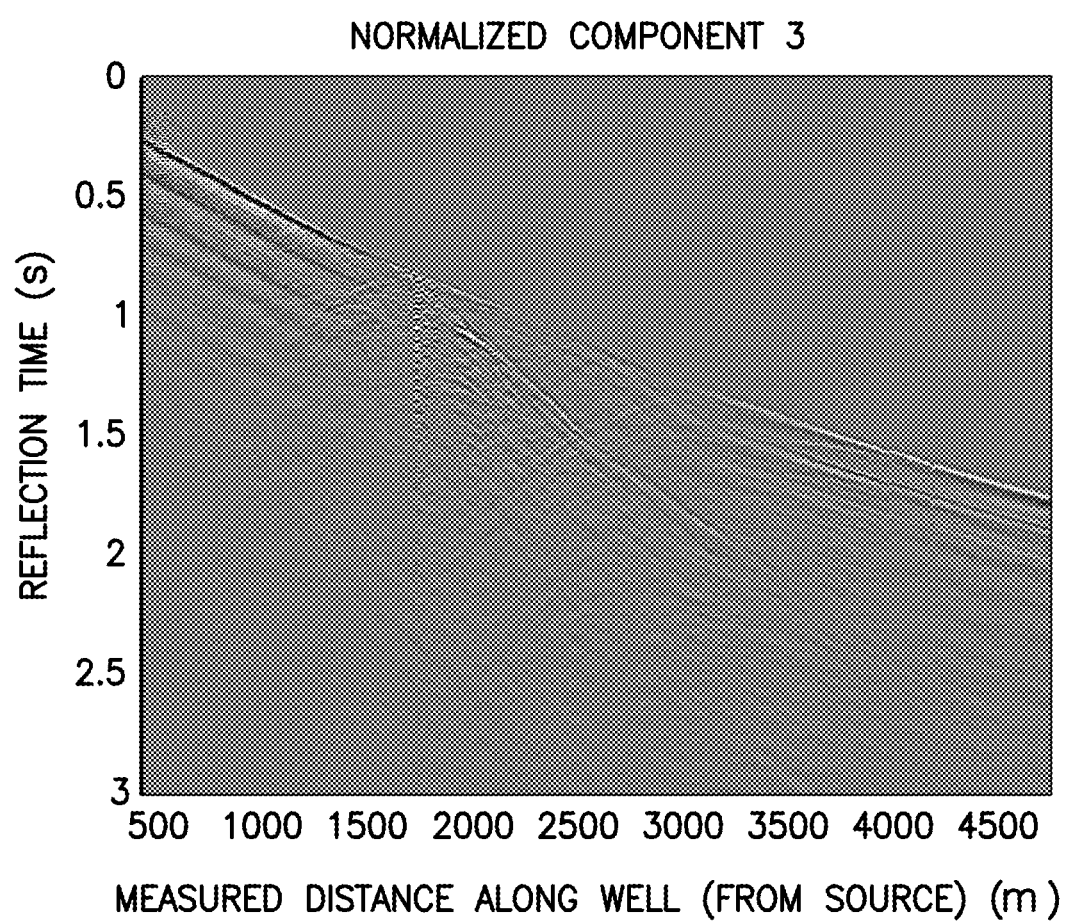
FIG. 4 represents axial components of raw data acquired in a horizontal well.

Presented in FIG. 1 is an extended reach well with a total length of around 4500 m. From a well length of around 3000 m, the well is essentially horizontal at a maximum depth of around 2200 m and reaches an offset of around 3000 m from the well head. FIGS. 2, 3, and 4 show data acquired in this well using a source deployed near the well head. The horizontal axis gives the distance from the well head, measured along the well. The 3D nature of the well trajectory gives significant presence of shear energy on the cross-line transverse components (shown in FIG. 3). This, mostly shear, energy is dominated by mode conversions at "measured depths" of 700 m and 1700 m. The depth is given relative to the kelley bushing (KB) adapter. It is to be noted that KB is an adapter that serves to connect the rotary table to the kelly. In oilfield operations, it is connected to the rotary table by four large steel pins that fit into mating holes in the rotary table. The rotary motion from the rotary table is transmitted to the bushing through the pins, and then to the kelly itself through the square or hexagonal flat surfaces between the kelly and the kelly bushing. The kelly then turns the entire drillstring because it is screwed into the top of the drillstring itself. Depth measurements are commonly referenced to the KB, such as 8327 ft KB, meaning 8327 feet below the kelly bushing.

Figure 5:
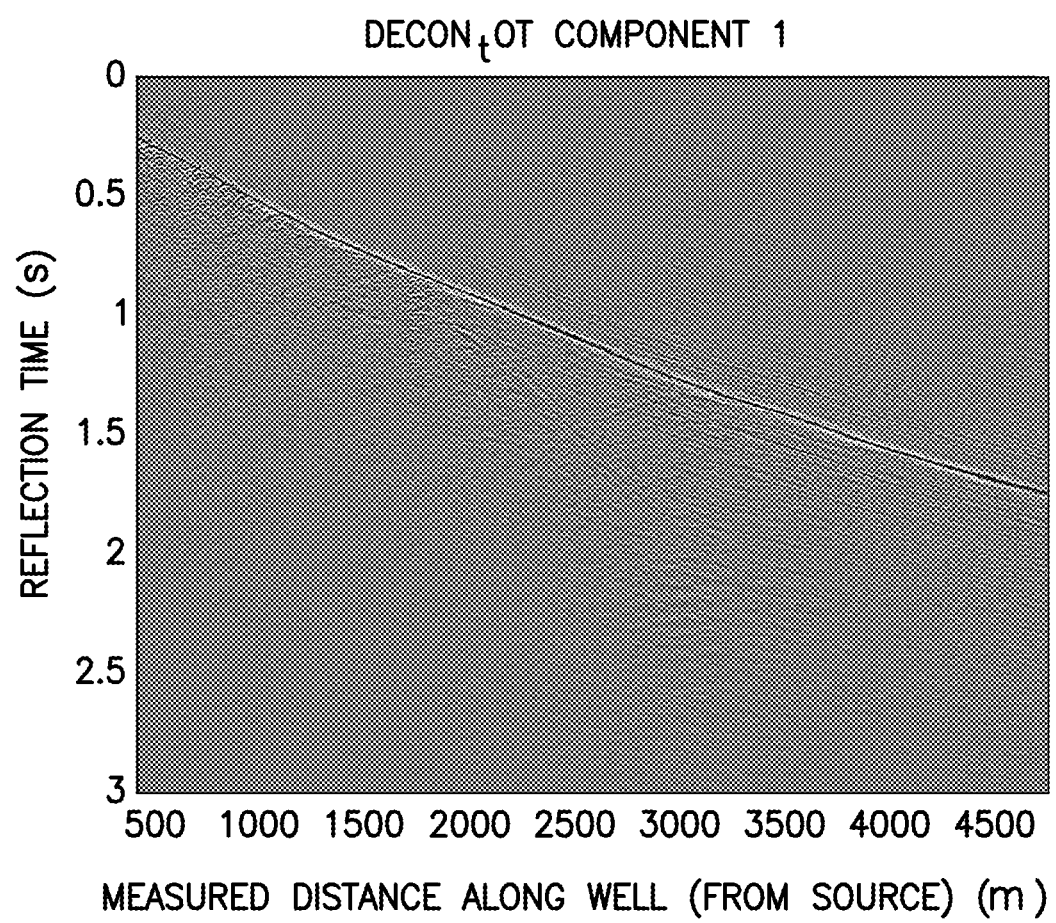
FIG. 5 represents horizontal components of data acquired in a horizontal well.
Figure 6:
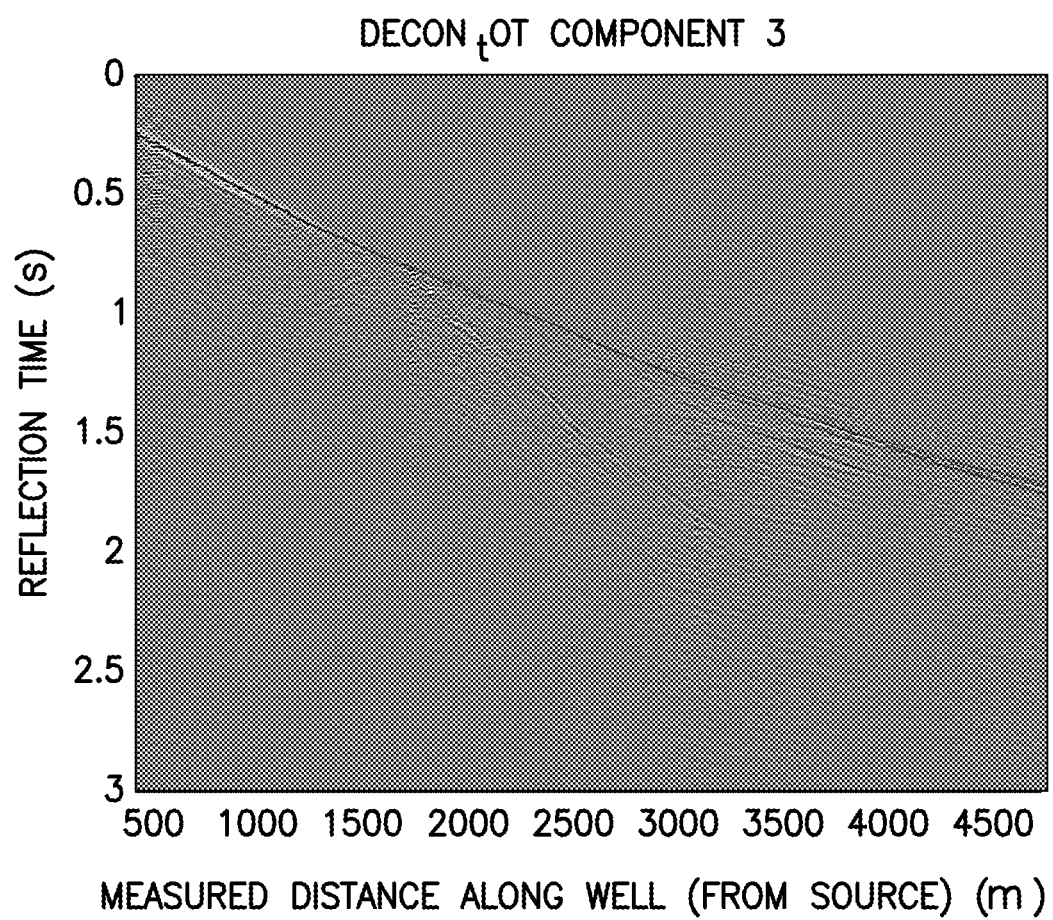
FIG. 6 represents vertical components of data acquired in a horizontal well.

The data were deconvolved using the "semblance-weighted" deconvolution operator described by Haldorsen et al. (1994). This operation compresses the down-going compressional field, giving the in-line horizontal and vertical components displayed in FIGS. 5 and 6. The light blue lines mark the arrival times for the direct compressional wave. The data have been deconvolved using an estimate of the direct compressional wave. The deconvolved data show evidence of the an interface penetrated by the well at around a measured depth of about 2650 m (at a vertical depth below Kelly Bushing (KB) slightly in excess of 2000 m, horizontal offset of around 1250 m from well head). This reflector appears to be generating reflected compressional waves, as well as both converted reflected and transmitted shear. The transmitted shear is particularly visible on the vertical component, which is what should be expected for the large source-receiver offsets encountered this deep into the well. It may also be noted that the transmitted shear attains the same apparent velocity as the direct compressional wave at the receivers deeper into the well. After the deconvolution based on the direct compressional energy, in accordance with the discussion in the previous section, the delay between the arrival at the well bore of the direct compressional and the converted waves is a measure of the distance from the well. This would mean that the "feature", along which the conversion takes place, is mostly parallel to the well bore.

Figure 7:
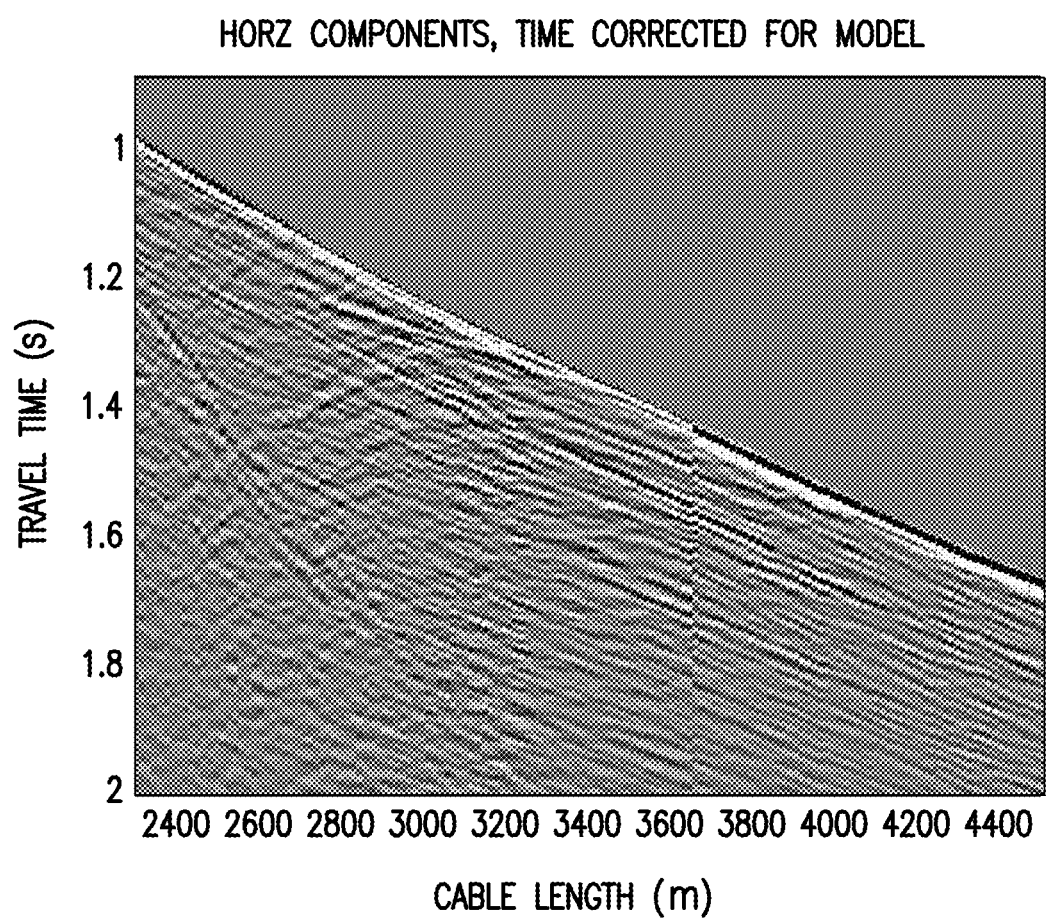
FIG. 7 represents details of data from FIG. 5, horizontal components of data acquired in a horizontal well, displayed as a function of distance along the well bore.
Figure 8:
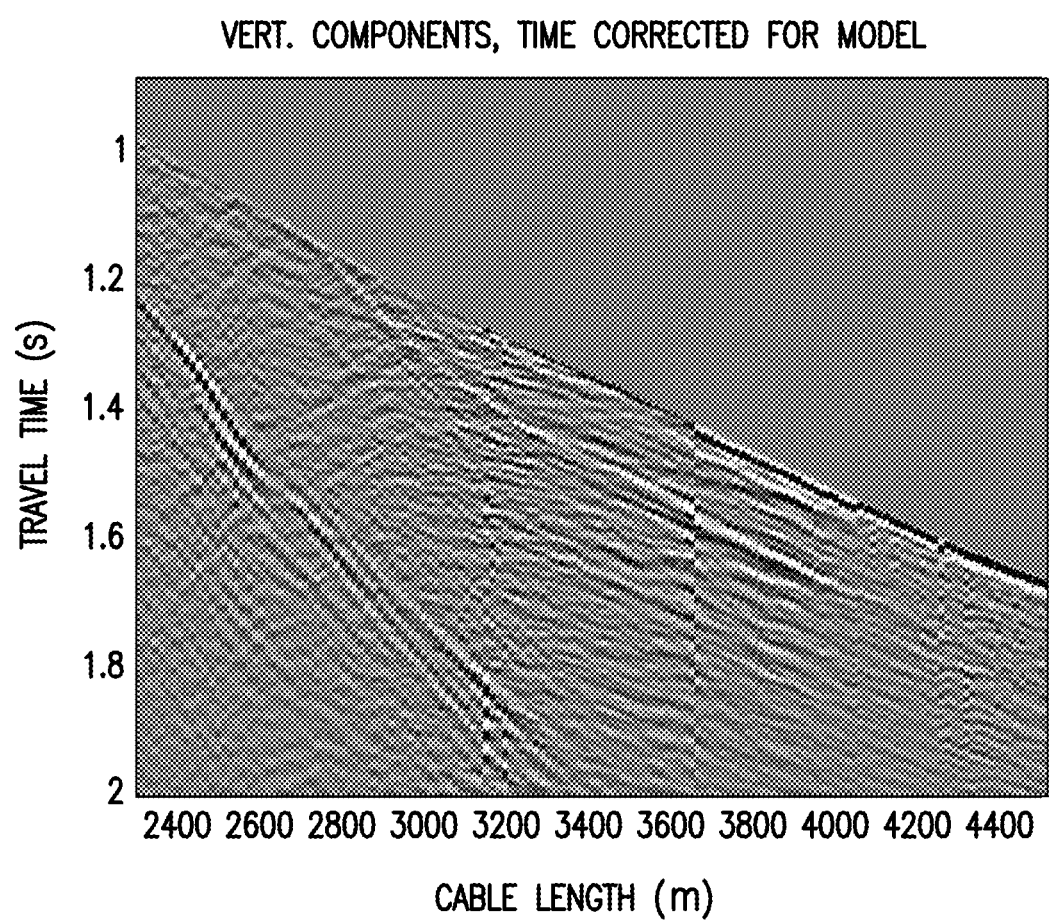
FIG. 8 represents details of data from FIG. 6, vertical components of data acquired in a horizontal well, displayed as a function of distance along the well bore.

FIGS. 7 and 8 show close-ups of the deconvolved data, horizontal and vertical components, over a range of about 2 km starting at around an offset of 1250 m. The dotted green line marks the time of arrivals for the direct compressional waves. The data have been deconvolved using an estimate of the direct compressional wave.

Without the prior separation of the shear and compressional, nor the up-going and down-going components of the wavefield, the deconvolved data were migrated using the projection method described by Haldorsen (2002). This algorithm extracts the compressional image by projecting the received wavefield onto the ray connecting the image point and the receiver, and the converted image by projecting perpendicular to this ray.

Figure 9:
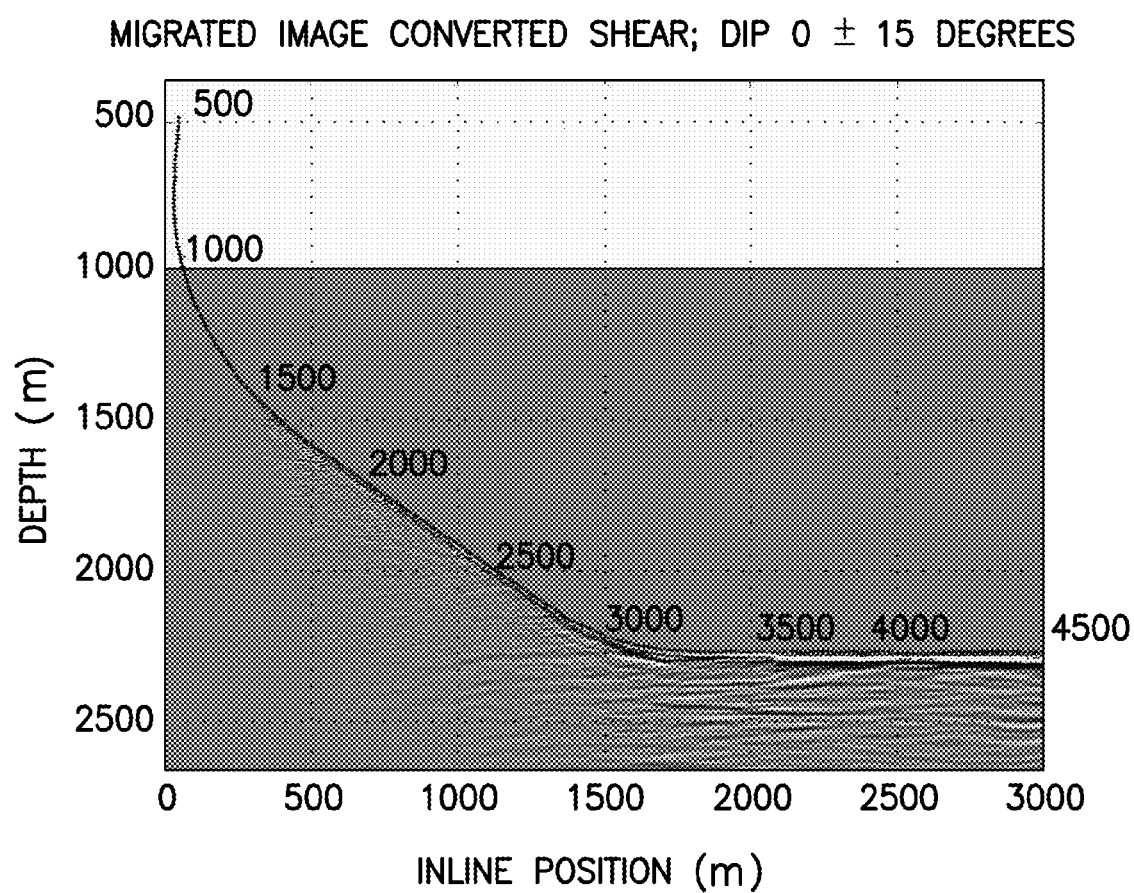
FIG. 9 represents image obtained from converted shear.
Figure 10:
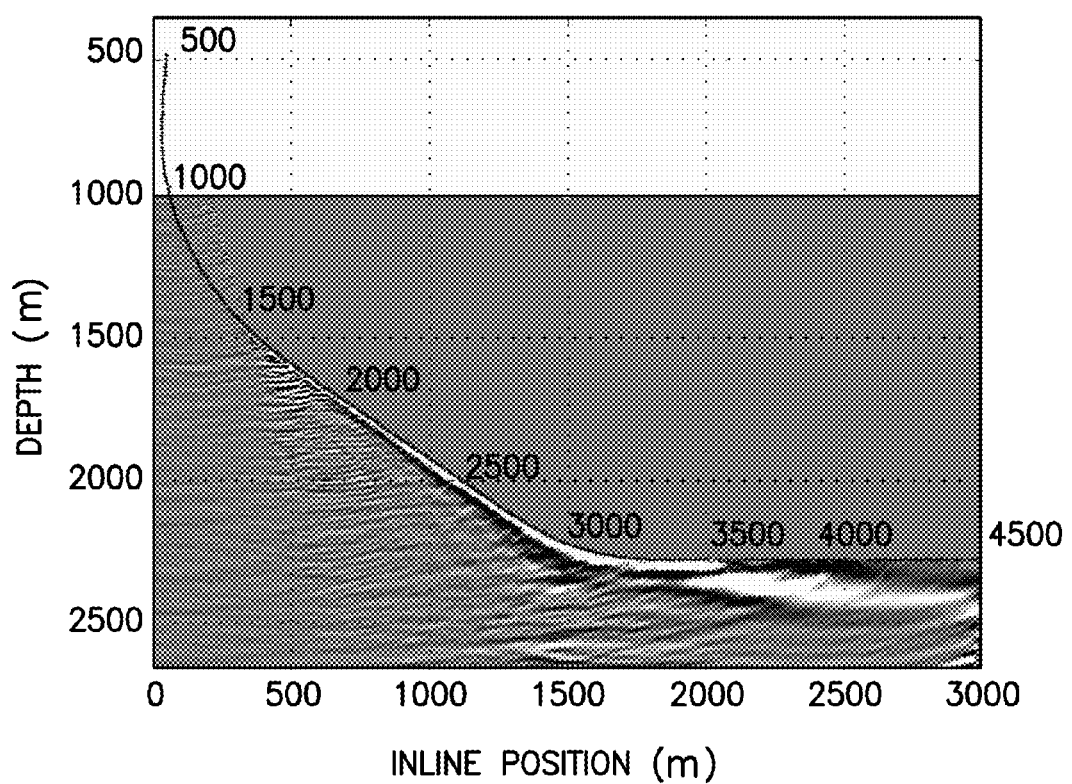
FIG. 10 represents "conventional" image obtained from reflected compressional waves.

FIG. 9 shows the reflection image obtained from converted shear. The measured depth (measured relative to KB) is indicated along the well trajectory. FIG. 10 shows the reflection image obtained from converted shear. For both images we used a formation-dip aperture of ±15°. Gently dipping features can be seen below the well on FIG. 9. Similarly, on FIG. 10, dipping features can be seen below the well, as well as significant, steeper dipping features, artifacts related to converted shear not sufficiently attenuated by the migration process. The measured depth (measured relative to the Kelly Bushing) is indicated along the wells.

Figure 11:
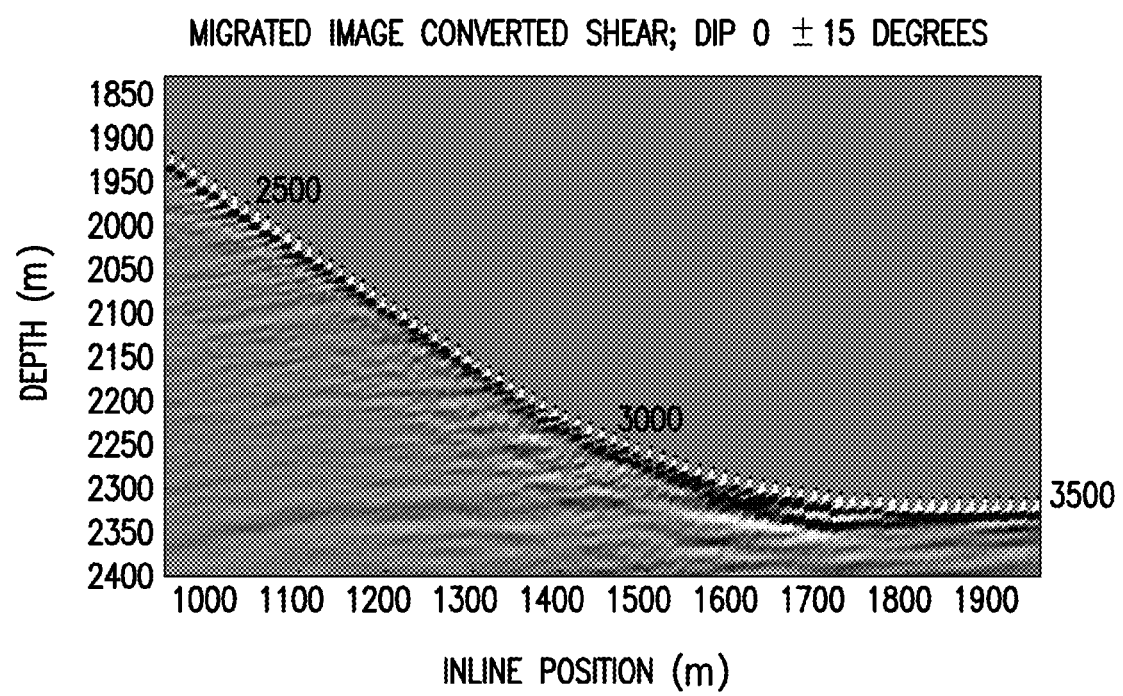
FIG. 11 represents details from FIG. 9, image obtained from converted shear.

The two images show essentially the same gently dipping structures and interfaces below the well. At the larger depths (deeper than 3000 m below KB), the compressional image becomes largely low-frequency, dominated by the large-angle scattering. In addition, in the shallower part of the well, the compressional reflection image shows significant, steeper dipping features close to the well bore. These features are most likely artifacts related to converted shear not sufficiently attenuated by the wavefield separation built into the migration process. This could in-parts be caused by the converted shear and compressional wave fields reflected from an interface not being mutually perpendicular. In general, and as should be expected, the converted-shear reflection image shows better resolution than the compressional image. In particular, one gets a better image of the reflector approached by the well near the heel of the well at around a vertical depth of 2250 m (measured depth of around 3150 m). It is not clear from the image (close-up in FIG. 11, wherein again, the measured depth—measured relative to the Kelly Bushing—is indicated along the well) whether this reflector is intersected by the well. There is some evidence of an additional interface coming really close to the well at around 4000 m below KB.

The feature pointed to in the discussion of the deconvolved data is seen on both images to intersect the well at around 2050 m vertical depth (at a depth below KB of about 2650 m).

Figure 12:
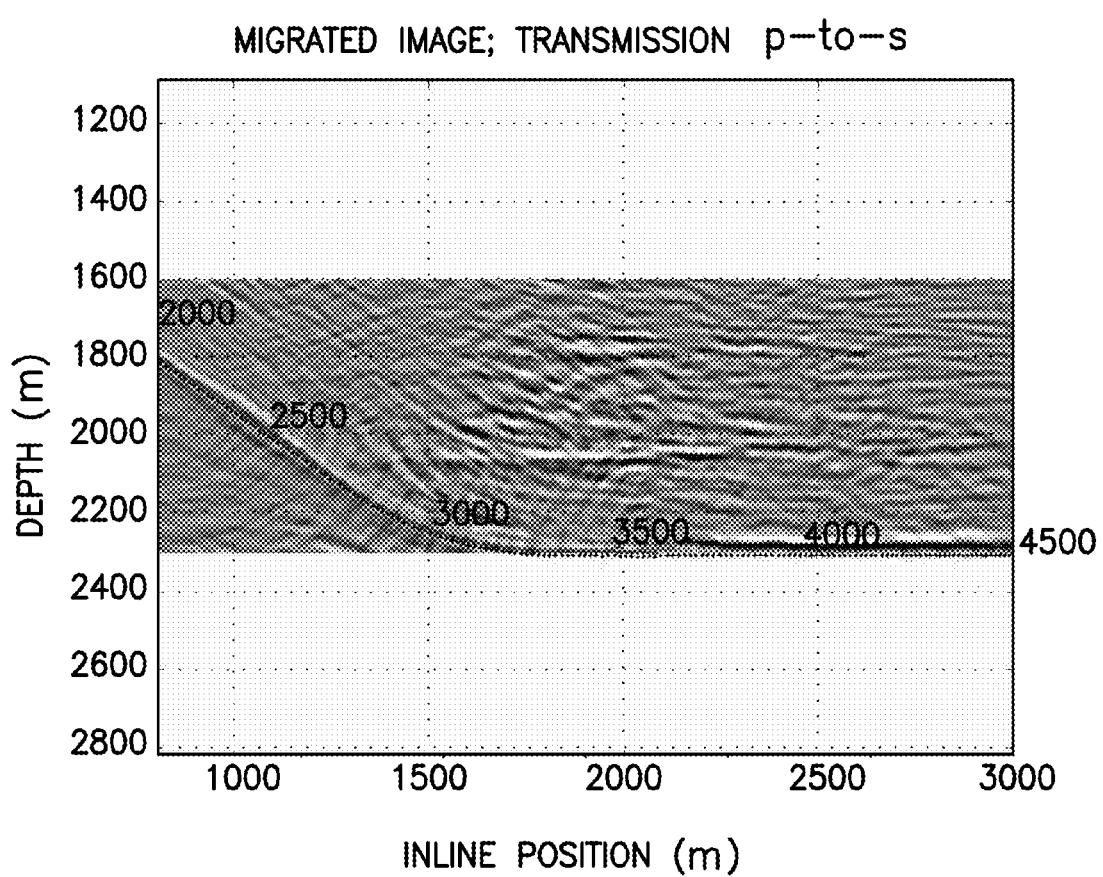
FIG. 12 represents image obtained from the down-going, vertically polarized, shear wave, containing shear converted between the source and receivers.

FIG. 12 shows the image obtained with the imaging method described in the previously, mapping the conversion points for shear waves having been converted between the source and the receivers. At a vertical depth of around 2050 m, the image shows an interface located above the well at a distance of around 200 m, intersecting the well at a measured depth of around 2650 m, consistent with discussions above.

Application to Wavefield Decomposition
(Embodiment B)

Parametric wavefield decomposition (e.g., Leaney and Esmersoy, 1989) uses a least-squares method to decompose a two-component wavefield locally into four plane waves: up- and down-going compressional, and up- and down-going shear polarized in the vertically plane. However, with a complex geology and long source-receiver offsets, this decomposition become less than trivial. For instance, the "down-going" compressional wavefield is moving mostly from left to right (in the way we have chosen our reference system), and so will compressional reflections from below the well. Nevertheless, we have used the estimated down-going compressional field, FIG. 13, to deconvolve the estimated down-going, shear polarized in the vertical plane (FIG. 14). The difficulty in doing an automatic wavefield separation, mostly based on polarization and apparent velocities across the receiver array, is noticeable at larger depths where the polarization and phase velocities of compressional wave-field components reflected from below the well may be very similar to the shear components converted above the well.

Figure 17:
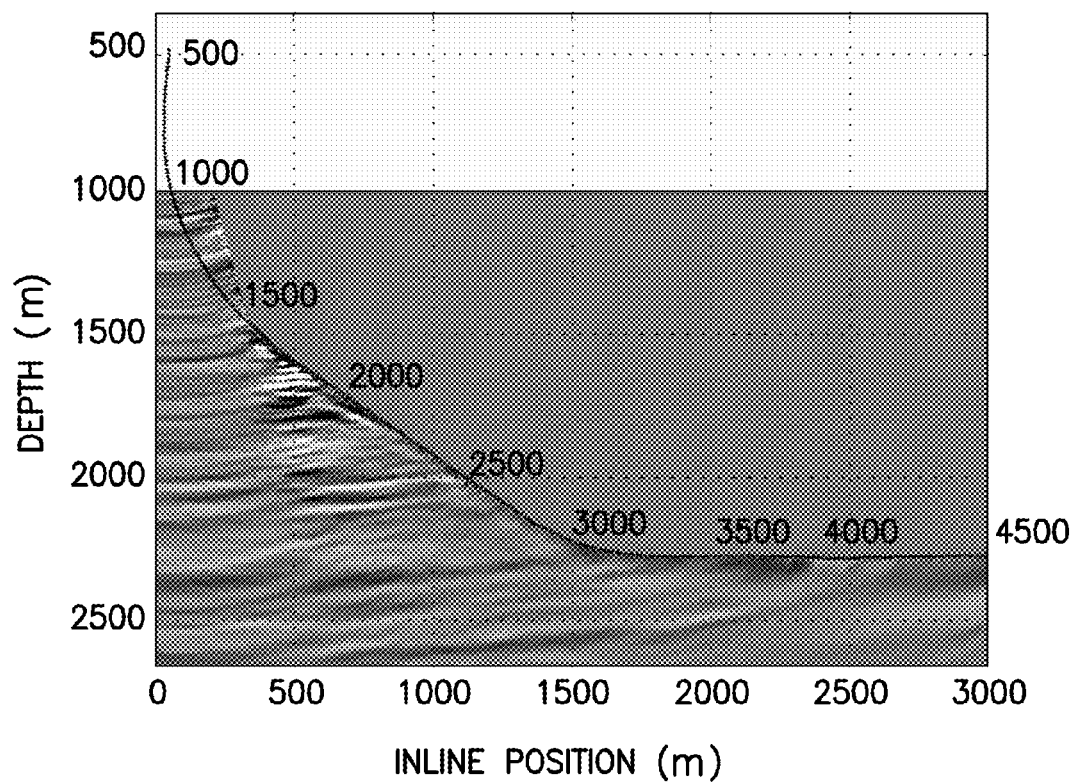
FIG. 17 represents an image obtained from the results of migrating the estimated up-going compressional.
Figure 18:
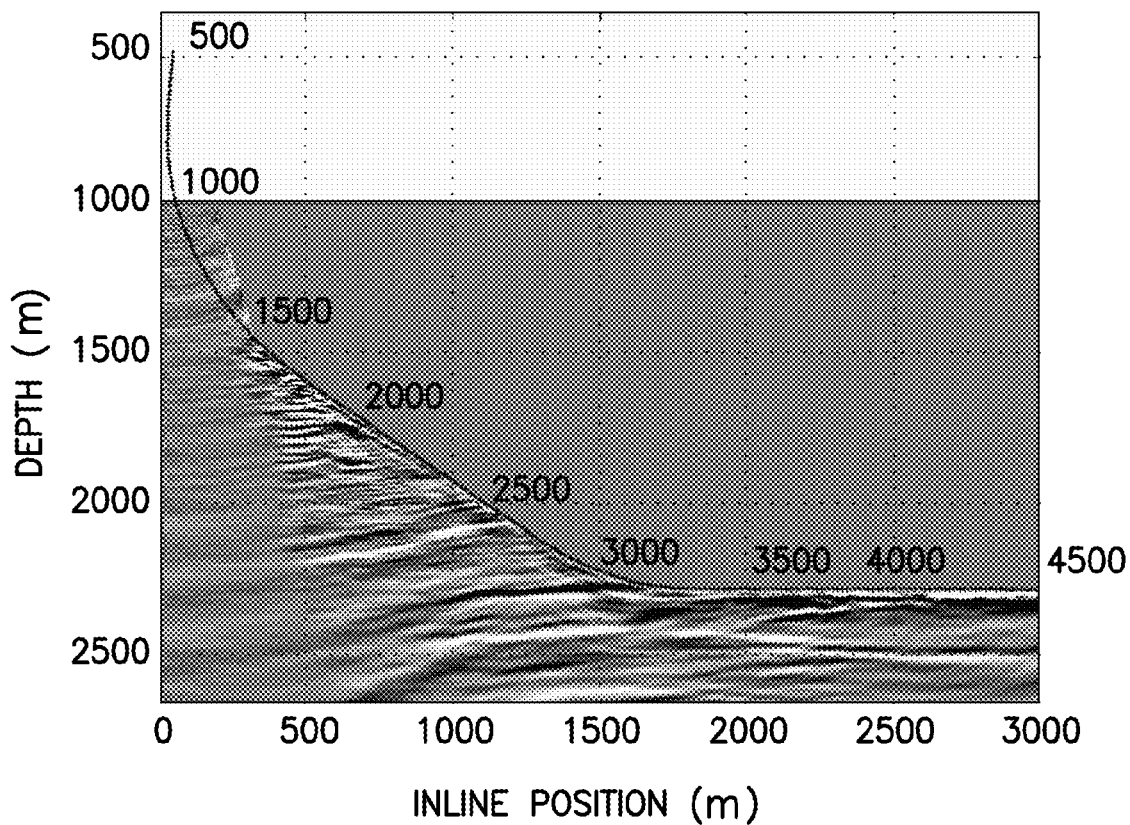
FIG. 18 represents an image obtained from the results of migrating the estimated shear.

Again, we used the Wiener-deconvolution operator designed by Haldorsen, et al. (1994), designing one single operator from the down-going compressional field. The resulting deconvolved down-going shear (FIG. 15 wherein two interfaces now appear at depths of around 1850 m and 2050 m), was migrated to locate the conversion point from compressional to shear (FIG. 16). For comparison, we also show the results of migrating the estimated up-going compressional (FIG. 17) and shear (FIG. 18). We can now see two strong conversion interfaces above the well at depthsof around 1850 and 2050 m. Compared to the images discussed in the previous section, the images obtained from the parametric wavefield separated data appear to have less artifacts but lower resolution.

Figure 19:
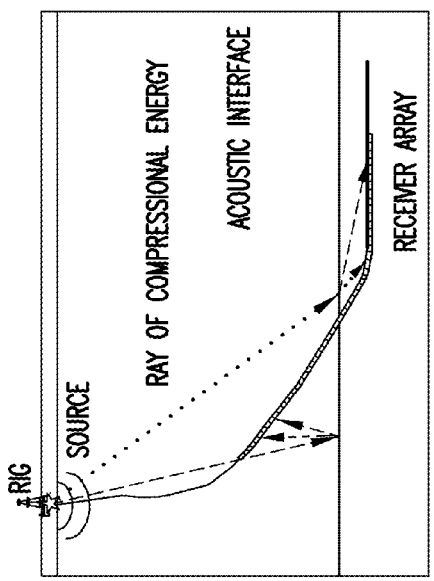
FIG. 19 represents the approximate ray paths and travel times for components that contribute to the reflection and transmission images and the deconvolved data from FIGS. 7 and 8 with components that contribute to the reflection images from FIGS. 9 and 10, and the transmission image from FIG. 12.
Figure 19:
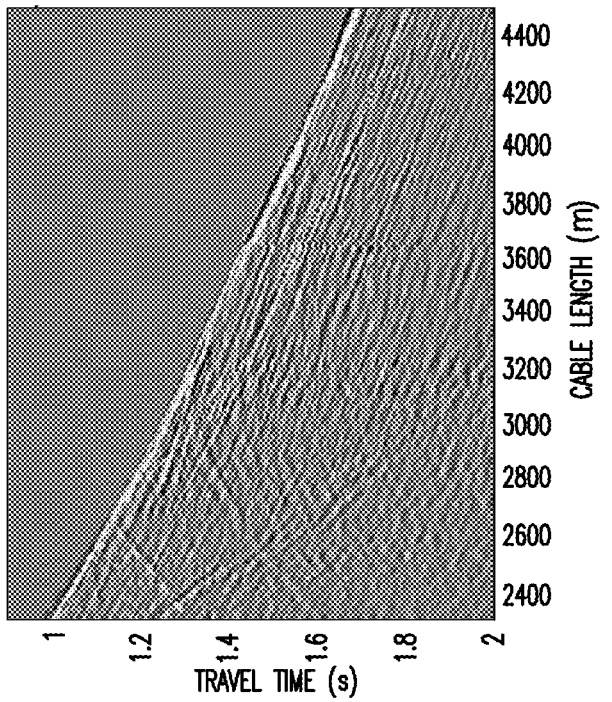
Figure 19:
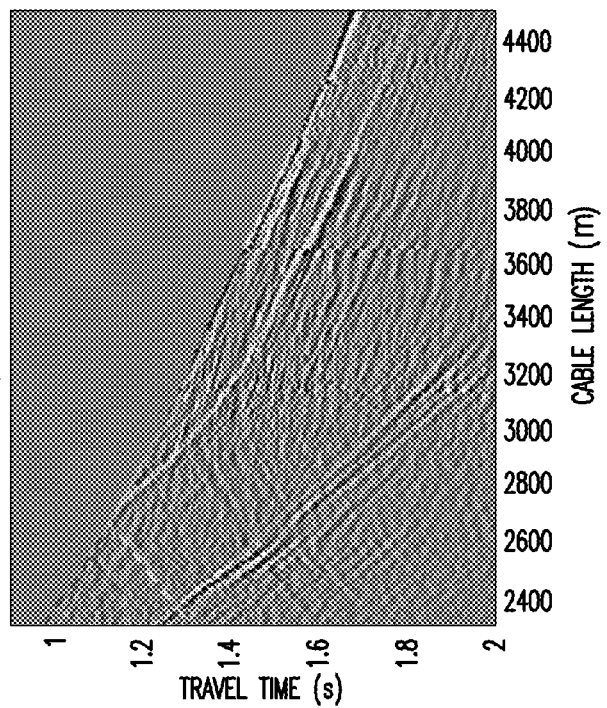

In FIG. 19 we show the approximate ray paths and travel times for the most prominent components that contribute to the reflection images and the transmission image and the deconvolved data from FIGS. 7 and 8 with the most prominent components that contribute to the reflection images from FIGS. 9 and 10, and the transmission image from FIG. 12. We have used dashed green for up-going compressional, dashed yellow for the up-going shear polarized in the vertical plane, and dotted yellow for the vertically polarized, down-going shear.

Figure 13:
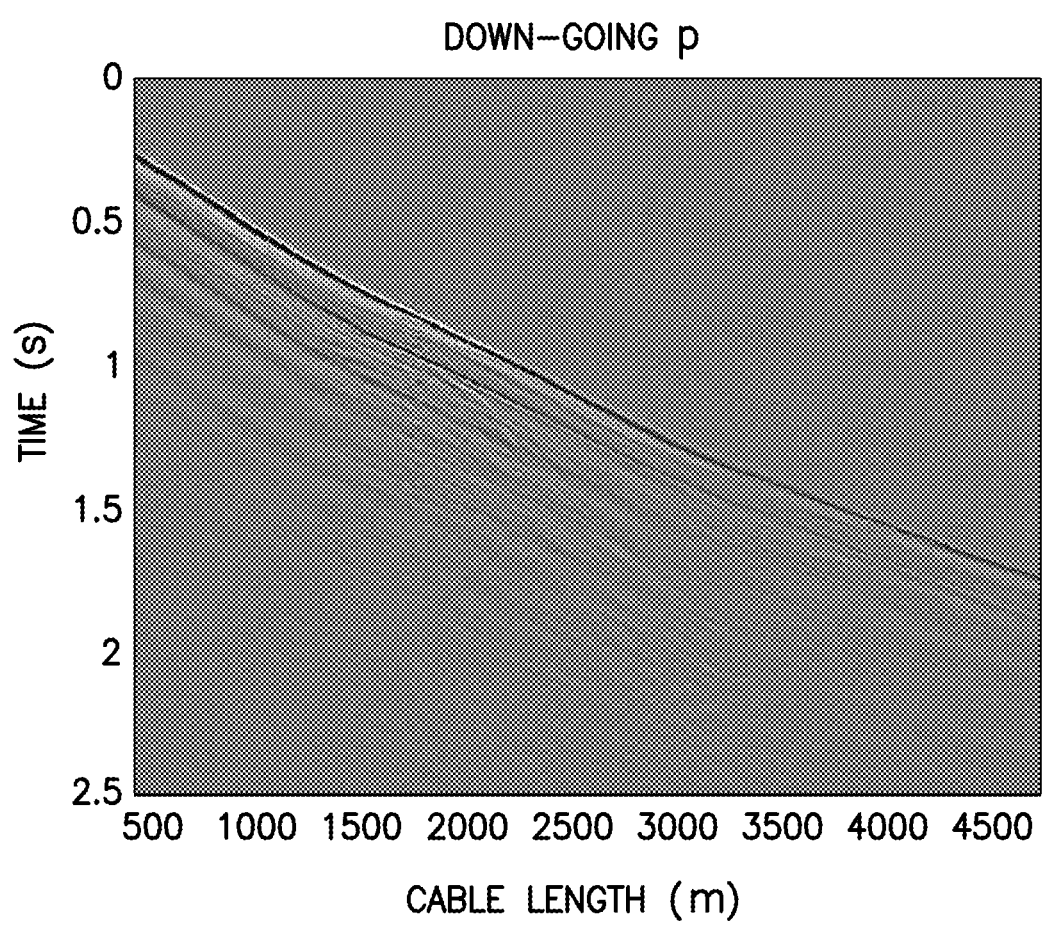
FIG. 13 represents down-going compressional wavefield, estimated using parametric wavefield decomposition.
Figure 14:
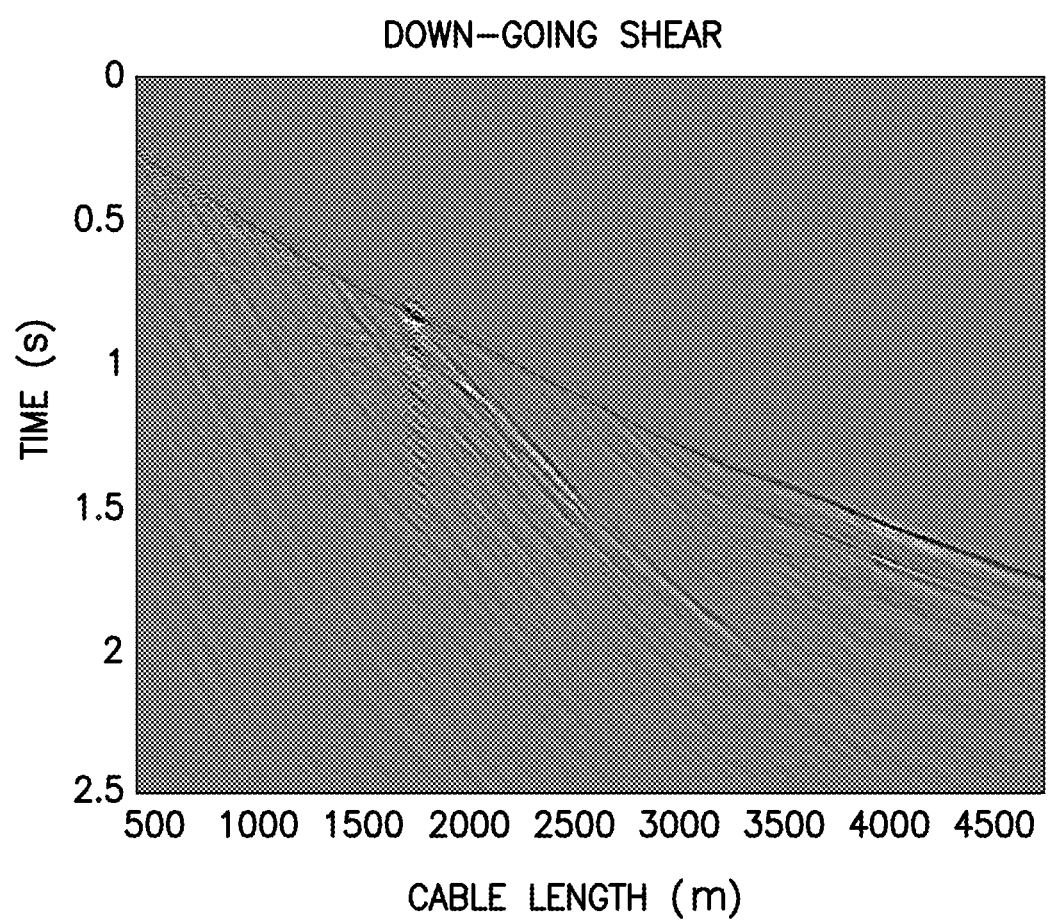
FIG. 14 represents down-going vertically polarized shear wavefield, estimated using parametric wavefield decomposition.
Figure 15:
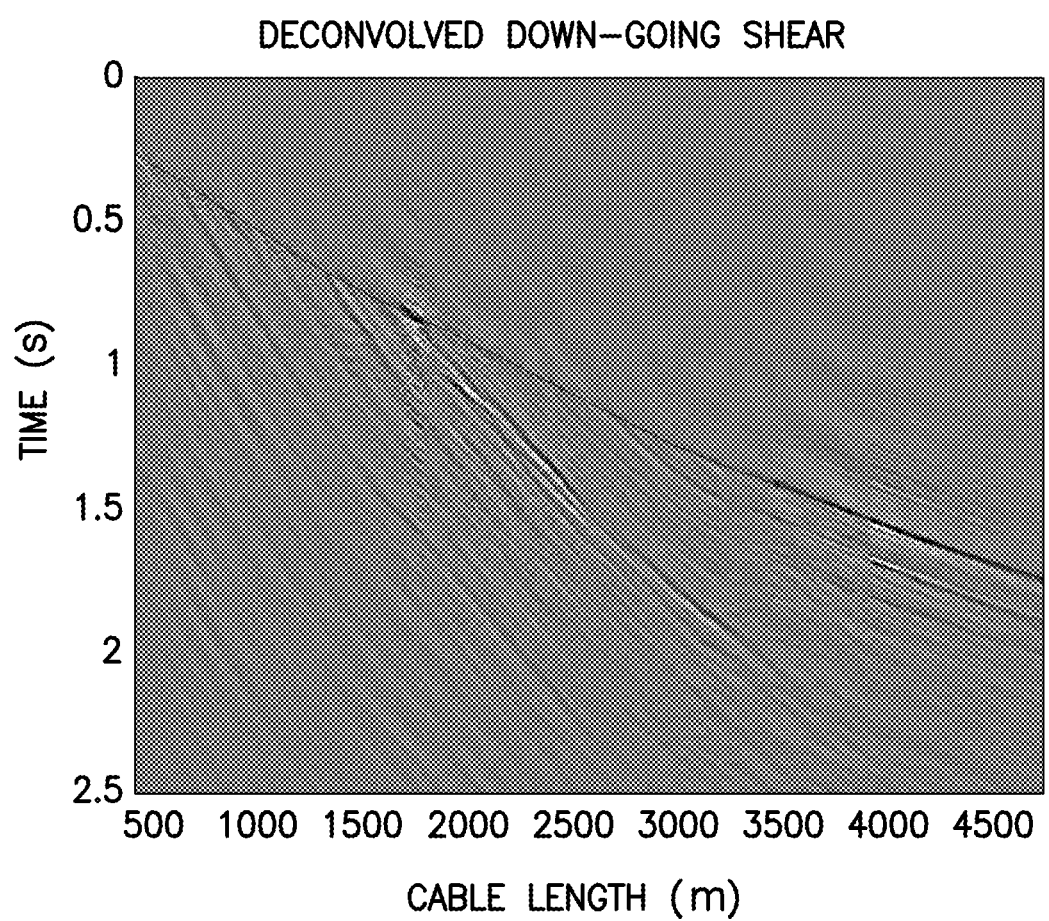
FIG. 15 represents deconvolved down-going vertically polarized shear wavefield, estimated using parametric wavefield decomposition.
Figure 16:
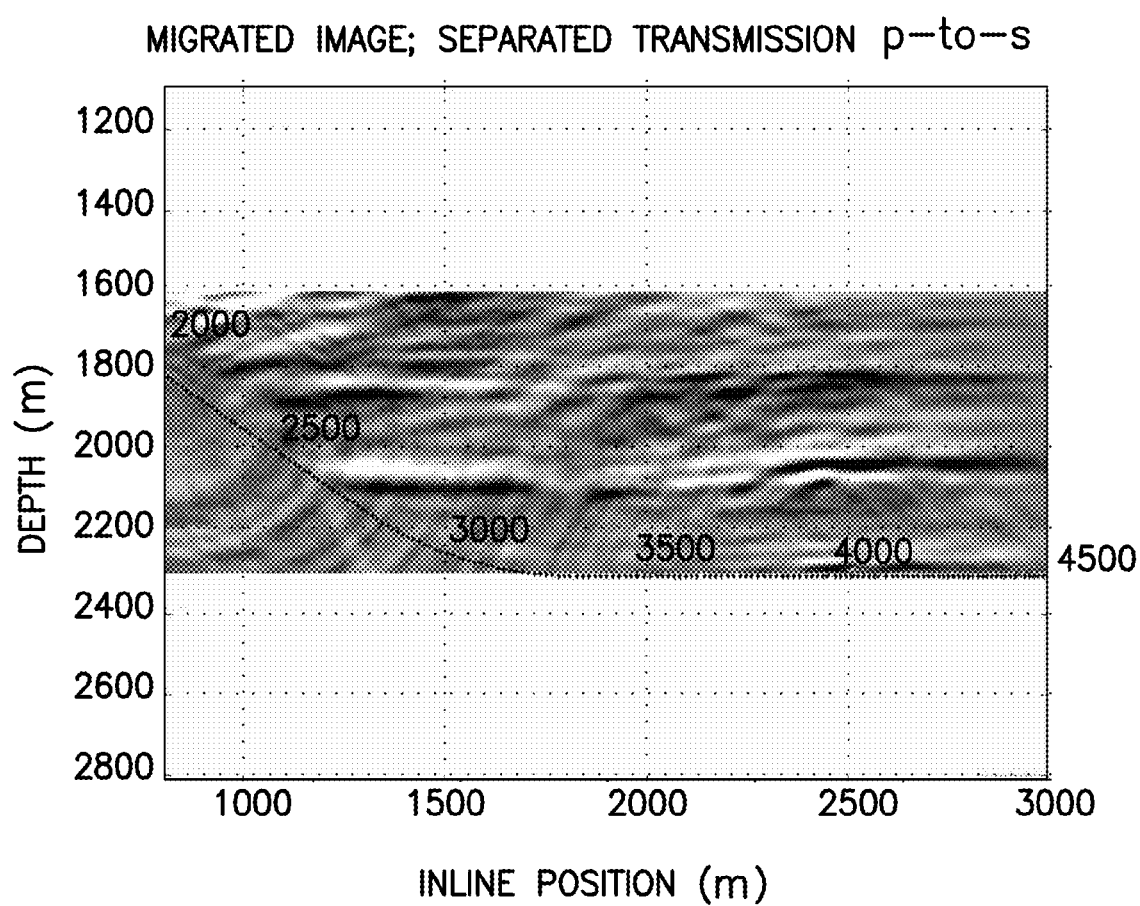
FIG. 16 represents image obtained from vertically-polarized, down-going, vertically-polarized shear, estimated by parametric wavefield decomposition.

A second, more distant, reflector at a depth of about 1850 m appears in the image of FIG. 16 when we use the down-going, vertically-polarized shear in FIGS. 14 and 15, estimated using parametric least-squares methods. It is possible that this is an artifact caused by insufficiently attenuated multiples. From FIGS. 2 and 4, 13 and 14, it is seen that the dominant multiple period is about 120 ms. The same figures furthermore show that the vertically-polarized shear, converted from the interface at 2050 m, at larger depths in the well, arrives at the receiver array about at the same time as the first reverberation in the direct, down-going compressional wave. These two different wavefield components, with about the same phase and apparent velocity but different polarization, will appear as one wavefield with a superposed polarization. This will make the parametric least-squares wavefield separation seriously difficult. The wavefield separation will make a partition one way or another. The objective for the subsequent deconvolution is to remove from the reflected, refracted and converted fields, the reverberations that are present in the estimated direct, down-going field. However, an incorrect partition of energy between the direct compressional and transmitted shear wavefield components may make the deconvolution ineffectual, resulting in an inadequate attenuation of the multiples contained in the down-going wavefield.

Now, comparing FIGS. 13 and 14, one may see that the events contributing to the image of the second reflector in FIG. 16, at a depth of 1850 m, coincides with the second multiple in the effective source signature.

In this instance it may look like the wavefield separation made within the migration operation in accordance with Haldorsen (2002), may be more robust in that it is allowing an ambiguity in labelling of the different components of the wavefield and does not require any events to be belonging exclusively to one and only one of the four categories.

We have demonstrated how a source and a horizontally offset array of 3-component receivers deployed in a wellbore can be used to image acoustic interfaces between the source and the receivers. The method uses the polarization and signature of the direct compressional wave, finds the vertically polarized shear wave mostly perpendicular to the direct compressional wave, and extrapolate the deconvolved shear signal along the direction of propagation back to its point of conversion.

The method generates an image of the interface along which the conversion took place. For extended-reach, horizontal wells, this offers a unique possibility for locating the well relative to a shallower interface of changing acoustic impedance.

What is claimed is:

1. A method of processing seismic data to produce an image of acoustic contrasts within a geological formation, comprising:
   (i). recording seismic data received by at least one receiver at a first receiver location from signals emitted by at least one source at a first acoustic source location;
   (ii). determining the components of particle motion of the geological formation at the first receiver location from the recorded seismic data using a processor;
   (iii). estimating the direct compressional signal at the first receiver location from the components of particle motion of the geological formation at the first receiver location;
   (iv). deconvolving all the components of particle motion at the first receiver location using the estimated direct compressional signal;
   (v). estimating, from a model of the geological formation, the difference between the shear and the compressional travel times from a first location in the geological formation to the first receiver location;
   (vi). estimating the shear-wave contribution at the first location in the geological formation using the deconvolved components of particle motion at the first receiver location and the estimated difference between the shear and the compressional travel times between the first receiver location and the first location in the geological formation; and
   (vii). repeating steps (i) to (vi) for a plurality of locations in the geological formation, wherein each location in the geological formation is located between the at least one acoustic source and the at least one receiver and wherein each location in the geological formation is linked to a pixel of the image of acoustic contrasts within the geological formation.

2. The method of processing seismic data according to claim 1, further comprising the steps of recording seismic data for a plurality of acoustic source locations at the first receiver location and summing the images of acoustic contrasts obtained from each of the plurality of source locations and the first receiver location.

3. The method of processing seismic data according to claim 1, further comprising the steps of recording seismic data for a plurality of receivers locations from signals emitted from a plurality of acoustic source locations and summing the images of acoustic contrasts obtained from each of the plurality of acoustic source locations and each of the plurality of receiver locations.

4. The method of processing seismic data according to claim 1, further comprising the steps of recording seismic data for a plurality of acoustic sources at the first receiver location and summing the images of acoustic contrasts obtained from each of the plurality of acoustic sources and the first receiver location.

5. The method of processing seismic data according to claim 1, further comprising the steps of recording seismic data for a plurality of receivers from signals emitted by the first acoustic source location and summing the images of acoustic contrasts obtained from each of the plurality of receivers and the first acoustic source location.

6. The method of processing seismic data according to claim 5, further comprising the step of orienting the components of particle motion near each one of the plurality of receivers along one set of orthogonal axes.

7. The method of processing seismic data according to claim 6, wherein the set of orthogonal axes comprises one vertical axis and two horizontal axes wherein the first horizontal axis is perpendicular to a plane defined by the tangent to a well trajectory at a particular location within the geological formation and the vertical axis, and the second horizontal axis is perpendicular to the first horizontal axis.

8. The method of processing seismic data according to claim 1, wherein the direct compressional signal from the components of particle motion at the first receiver location is estimated from a time-window around the arrival of an unreflected acoustic signal received at the first receiver location.

9. The method of processing seismic data according to claim 1, wherein the shear-wave contribution is further estimated by projecting the components of particle motion for the geological formation at the first receiver location along an axis orthogonal to a ray connecting the at least one receiver to respectively each one of the plurality of locations in the geological formation.

10. The method of processing seismic data according to claim 1, wherein the direct compressional signal is estimated using a parametric waveform-separation method.

11. The method of processing seismic data according to claim 1, wherein the shear-wave contributions are estimated using a parametric waveform-separation method.

12. The method of processing seismic data according to claim 1, wherein the estimating the shear-wave contributions for each one of a plurality of locations in the geological formation is modulated using respective weights obtained from using a migration theory.

13. The method of processing seismic data according to claim 1, wherein the at least one acoustic source is located on the surface of the earth.

14. The method of processing seismic data according to claim 1, wherein the at least one acoustic source is located in a wellbore within the geological formation.

15. The method of processing seismic data according to claim 1, wherein the at least one acoustic source is located in a wellbore within the geological formation and the at least one receiver is located in another wellbore within the geological formation.

16. The method of processing seismic data according to claim 1, wherein the model of the geological formation is estimated from data selected from the group consisting of VSP travel times, sonic logs, surface-seismic data and general knowledge of the geological formation.

* * * * *